US012209532B2

(12) United States Patent
Sapra et al.

(10) Patent No.: US 12,209,532 B2
(45) Date of Patent: Jan. 28, 2025

(54) COMPRESSION IGNITION ENGINE WITH IGNITER AND PILOT INJECTOR

(71) Applicant: Wisconsin Alumni Research Foundation, Madison, WI (US)

(72) Inventors: Harsh Darshan Sapra, Madison, WI (US); Sage Kokjohn, Oregon, WI (US); Randy Hessel, Madison, WI (US); Eri Amezcua Cuellar, Madison, WI (US); David Rothamer, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 36 days.

(21) Appl. No.: 18/176,787

(22) Filed: Mar. 1, 2023

(65) Prior Publication Data

US 2024/0295188 A1 Sep. 5, 2024

(51) Int. Cl.

*F02B 9/04* (2006.01)
*F02B 43/12* (2006.01)
*F02B 69/04* (2006.01)
*F23Q 7/00* (2006.01)

(52) U.S. Cl.

CPC ................ *F02B 9/04* (2013.01); *F02B 43/12* (2013.01); *F02B 69/04* (2013.01); *F23Q 7/001* (2013.01)

(58) Field of Classification Search

CPC .. F02B 9/04; F02B 43/12; F02G 69/04; F23Q 7/001

USPC ........................................................ 123/27 R

See application file for complete search history.

(56) References Cited

U.S. PATENT DOCUMENTS

| | | | | |
|---|---|---|---|---|
| 4,765,293 | A * | 8/1988 | Gonzalez | F02F 3/02 123/262 |
| 2012/0160221 | A1* | 6/2012 | Munshi | F02M 21/0206 123/575 |
| 2014/0190452 | A1* | 7/2014 | Ikeda | F02D 41/1497 123/472 |
| 2022/0003184 | A1* | 1/2022 | Blumreiter | F02D 19/0649 |
| 2023/0279802 | A1* | 9/2023 | Merical | F02B 19/12 123/253 |

OTHER PUBLICATIONS

Niranjan Miganakallu et al.; "Impact of Ignition Assistant on Combustion of Cetane 30 and 35 Jet-Fuel Blends in a Compression-Ignition Engine at Moderate Load and Speed." In Internal Combustion Engine Division Fall Technical Conference, vol. 86540, pp. V001T03A011-1 toV001T03A011-12. American Society of Mechanical Engineers, 2022. US.

* cited by examiner

*Primary Examiner* — Yi-Kai Wang

(74) *Attorney, Agent, or Firm* — Boyle Fredrickson, S.C.

(57) ABSTRACT

A compression ignition engine provides a main injector and a second pilot injector producing a spray passing over an igniter producing a pilot flame assisting in ignition of the main injector spray.

15 Claims, 2 Drawing Sheets

COMPRESSION IGNITION ENGINE WITH IGNITER AND PILOT INJECTOR

STATEMENT REGARDING FEDERALLY SPONSORED RESEARCH OR DEVELOPMENT

This invention was made with government support under W911-NF-20-2-0181 awarded by the ARMY/ARO. The government has certain rights in the invention.

CROSS REFERENCE TO RELATED APPLICATION

--

BACKGROUND OF THE INVENTION

The present invention relates to internal combustion engines and in particular to compression ignition engines operable with a wide range of fuels including low carbon fuels.

Internal combustion engines include the broad categories of spark ignition (SI) engines, in which premixed fuel and air are ignited with an electrical spark, and compression ignition engines (CI) where high compression ratios produce temperatures and pressures that cause autoignition of introduced fuel.

CI engines can have greater thermodynamic efficiency than SI engines, in part by eliminating intake throttling used in SI engines, and in part by providing high compression/expansion ratios impractical with SI engines because of the risk of autoignition (knock) and/or pre-ignition in the premixed air and fuel mixture of an SI engine. The benefits of CI engines are offset by the need for special fuels that can reliably auto-ignite at compression temperatures, for example, fuels having a high cetane number and high carbon content, such as diesel fuel.

The use of low carbon fuels in internal combustion engines, such as methanol, ethanol, dimethyl-ether, ammonia, methane, and hydrogen, presents promising alternatives to the problem of reducing greenhouse gas emissions while maintaining the advantages of a high-energy density fuel. The low effective cetane numbers for such low carbon fuels, however, make them difficult to use in conventional compression ignition internal combustion engines.

SUMMARY OF THE INVENTION

The present invention provides a compression ignition engine having a secondary "pilot" injector directing a fuel stream over an igniter, such as a glow plug, to create a pilot flame igniting fuel from a primary "main" injector. An engine employing this approach can work with different quality fuels including low cetane number fuels with a wide range of properties and more generally can substantially reduce soot, carbon monoxide, and hydrocarbon emissions. The ability to place the igniter and pilot injector off-center from the cylinder axis allows this design to be readily incorporated into existing engine designs where the cylinder head is crowded with valve openings and the main injector.

More specifically, in one embodiment, the invention provides an internal combustion engine having a set of cylinders and interfitting pistons movable within the cylinders to compress air in a combustion chamber region at an end of each cylinder at a compression ratio of no less than 13:1. A first (main) injector assembly and second (pilot) injector assembly communicate with each combustion chamber through respective valves to control first and second sprays. An igniter is positioned along the at least one second spray axis to ignite the second spray.

It is thus a feature of at least one embodiment of the invention to provide an independently controllable pilot flame timed to assist in the ignition of fuel from the main injector substantially improving combustion.

The spray of the main injector may extend radially outwardly from an injection point at a central axis of the combustion chamber, and the spray of the pilot injector may be directed toward the main injector injection point.

It is thus a feature of at least one embodiment of the invention to promote uniform ignition of the main injector spray by directing the pilot flame to the common point of divergence of the spray from the main injector.

The upper surface of the pistons may include upwardly open bowl portions having a bowl bottom with a pip extending upwardly from the bowl bottom.

It is thus a feature of at least one embodiment of the invention to provide a piston upper surface shape operating to direct the pilot flame from the pilot injector upward toward the main injector.

The engine may include an injector controller controlling valves of the main and pilot injectors so that the pilot injector is actuated before the main injector.

It is thus a feature of at least one embodiment of the invention to allow the pilot flame of the pilot injector to be established before the desired ignition point of the fuel of the main injector so as to provide rapid ignition of the fuel from the main injector when the desired ignition point is reached.

The injector valve controller may control the main valve and pilot valve to inject more than twice as much fuel mass through the main injector than through the pilot injector during a combustion cycle.

It is thus a feature of at least one embodiment of the invention to minimize the fuel injected through the pilot injector to that necessary for combustion promotion so that the bulk of the fuel may be deployed through the main injector at an optimum timing for thermodynamic efficiency.

The igniter may be a glow plug and include a glow plug power source providing continuous power to the glow plug during operation of the engine.

It is thus a feature of at least one embodiment of the invention to employ reliable and well-understood glow plug technology for generating the desired pilot flame.

The internal combustion engine may further include a chamber at least partially surrounding the igniter and adapted for receiving the spray of the pilot injector for exit through at least one chamber exit opening to increase a dwell time of the pilot spray in a vicinity of the igniter.

It is thus a feature of at least one embodiment of the invention to flexibly control coupling between the glow plug energy and the pilot injector spray to optimize ignition of the pilot injector spray.

The glow plug chamber may include multiple glow plug chamber exits.

It is thus a feature of at least one embodiment of the invention to allow the generation of multiple pilot flames from a single pilot injector for improved management of limited cylinder head area.

The engine may include an igniter controller changing power to the igniter as a function of at least one of engine load and engine speed.

It is thus a feature of at least one embodiment of the invention to improve the efficiency of the glow plug by controlling its power according to engine operating condition.

These particular objects and advantages may apply to only some embodiments falling within the claims and thus do not define the scope of the invention.

DETAILED DESCRIPTION OF THE PREFERRED EMBODIMENT

Figure 1:
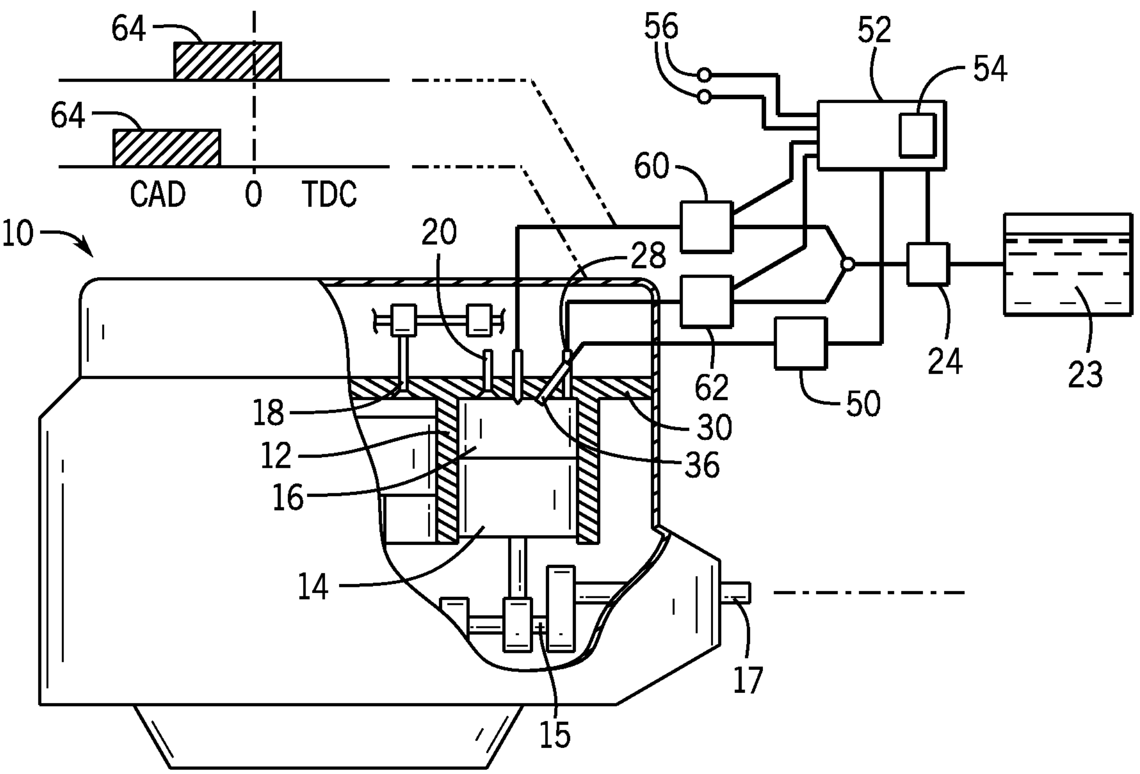
FIG. 1 is a simplified, partial cross-section of a compression ignition internal combustion engine providing a main and pilot injector and a glow plug.
Figure 2:
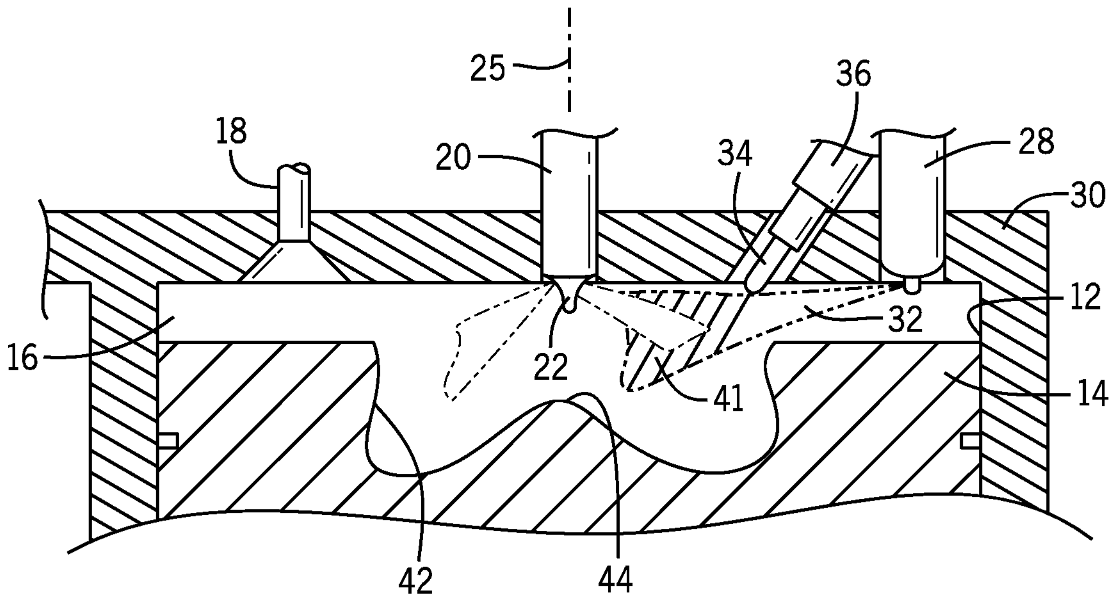
FIG. 2 is an enlarged fragmentary view of the cylinder head and upper piston surface of one cylinder of the engine of FIG. 1 showing the injector spray patterns for the main and pilot injectors.

Referring now to FIGS. 1 and 2, a compression ignition internal combustion engine 10, for example, having a compression ratio in excess of 12:1 and as much as 25:1 may provide for multiple cylinders 12 each containing a piston 14 sliding sealingly within the cylinder 12 to compress air and possibly fuel within a combustion chamber 16 defined by the space between the piston 14 and one end of the cylinder 12 providing a cylinder head 30. Multiple pistons 14 may be interconnected by a crankshaft 15 to a common driveshaft 17 per standard engine construction.

The upper wall of the combustion chamber 16 may provide for intake and exhaust valves 18 (only one shown for clarity) opened and closed in time with movement of the piston 14 per conventional methods, to allow fresh air to be drawn into the combustion chamber 16 through an intake valve 18 with the downstroke of the piston 14 and exhaust gases to be removed from the combustion chamber 16 after combustion through an exhaust valve 18.

Figure 3:
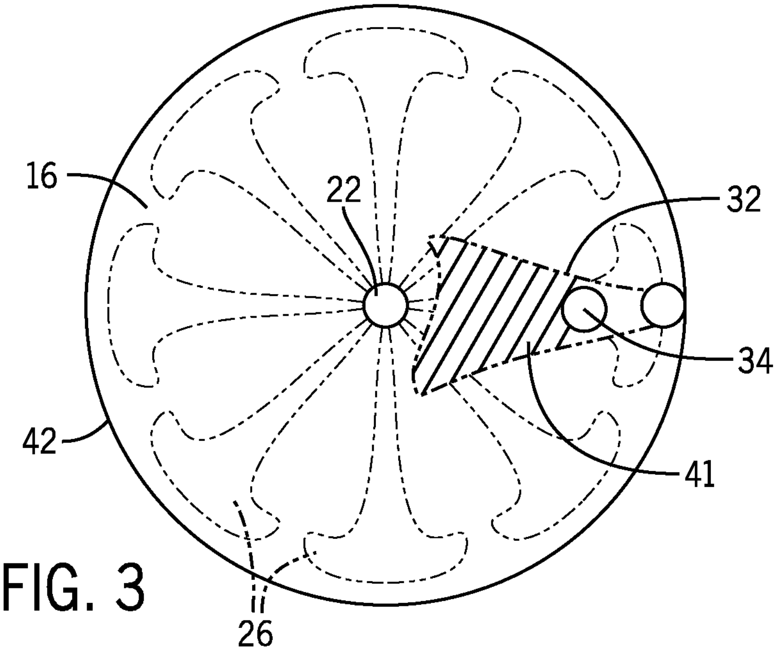
FIG. 3 is a top plan view of the injector spray patterns of FIG. 2.

Positioned between the valves 18 is main fuel injector 20 having a nozzle 22 extending into the combustion chamber 16 for injecting a high cetane number fuel, or an autoignition-resistant fuel (low cetane number) 23, such as, but not limited to, low carbon fuel such as ethanol, methanol, dimethyl-ether, ammonia, methane, hydrogen, and the like. The fuel 23 may be pressurized as received from a pump 24 or as received from a pressure regulator for pre-pressurized fuel such as liquefied gas. Referring also to FIG. 3, the main fuel injector 20 is generally centered along a cylinder axis 25 to distribute fuel radially outward from that point into the combustion chamber 16, for example, in multiple plumes 26.

A secondary or pilot fuel injector 28 is positioned near one edge of the cylinder head 30 toward a wall of the cylinder 12 to provide fuel in a pilot plume 32 generally directed toward the nozzle 22 of the main injector 20 to intercept the base of the plumes 26. The pilot plume 32 passes across a heated tip 34 of a glow plug 36 (or other ignition device) which serves to ignite the pilot plume 32 prior to reaching the vicinity of the nozzle 22 to thus produce a pilot flame 41 (shown by crosshatching in FIG. 3) that will ignite the fuel of the multiple main plumes 26 at the common region of their base near nozzle 22.

The offset position of the glow plug 36 and the pilot fuel injector 28 on the cylinder head 30 is such as to fit between the valves 18 of the engine and thus to integrate readily into current and future engine designs, for example, typically having multiple intake and exhaust valves using substantial area of the cylinder head 30.

As shown in FIG. 2, the upper surface of the piston 14 may include a bowl 42 providing an upwardly open depression in the upper surface of the piston to receive and concentrate the pilot flame 41 and the plumes 26 for initial combustion. The bottom surface of the bowl 42 may include an upwardly extending pip 44 being an elevation that directs and focuses the pilot flame 41 toward the plumes 26 from the nozzle 22.

As shown in FIG. 2, the glow plug 36 may receive power from a power supply 50 operating to induce an elevated temperature in the glow plug tip 34 in excess of 1000 Kelvin and typically between 1000° Kelvin and 1600 Kelvin suitable for igniting the plume 32.

An engine controller 52, for example, executing a stored program 54, may communicate with sensors 56 monitoring engine operating conditions such as engine load and engine speed to modulate the power to the glow plug 36 through the power supply 50 to maintain this temperature during continued power application to the glow plug 36 during engine operation. This modulation is intended to accommodate changes in heat dissipation from the glow plug tip 34 as it is exposed to different rates of fuel and air flow and different temperatures and cooling rates of the combustion chamber 16 under varying loads, and thus reduce power to the glow plug tip 34 to that necessary to maintain a temperature that will ignite the plume 32, that temperature also varying under engine operating conditions. More generally, power may be provided continuously to the glow plug 36 during operation of the engine 10 in contrast to standard glow plug usage in diesel engines and the like where glow plug power is cut after engine operating temperatures are reached.

Each of the injectors 29 and 28 may be controlled by separate injector valves 60 and 62, respectively, in turn controlled by engine controller 52 to provide different timing of the initiation and duration of the injection plumes 26 and 32. Generally, the injection plume 32 will be initiated first, as indicated by injection timing pulse 64, and continue to overlap with subsequently initiated injection plumes 26 indicated by injection timing pulse 66, but to cease before ending of the injection of the main injector 29.

The injector valves 60 and 62 are also controlled so that the main injector 20 delivers at a minimum the same amount of fuel and typically more than twice or more than five times as much fuel as the pilot injector 28 consistent with the role of the pilot injector 28 as an ignition source. Both injectors 20 and 28 may connect to the same fuel tank and use the same fuel 23.

Generally, the injectors 29 and 28 may be constructed according to well-known techniques for constructing direct injectors for diesel or gasoline engines and may provide either a mechanical injector mechanism or electrical solenoid-driven injectors as are generally understood in the art.

Example, but nonlimiting, operating parameters for the engine 10 are provided below:

| | | |
|---|---|---|
| Engine Speed | 1200 | [rpm] |
| Igniter temperature | 1400 | [K] |
| Injection Duration (Pilot/Main) | 6.314/4.752 | [CAD] |
| Injection Timing (Pilot/Main) | −10.5/−4.5 | [CAD] |
| Pilot/Main Injected Fuel Mass | 1/11 | [mg] |

-continued

| | |
|---|---|
| IVC Pressure | 0.88 [bar] |
| IVC Temperature | 320 [K] |
| Cone Angle | 18 [deg] |
| Tilt Angle (Pilot/Main) | 80/70 [deg] |
| Swirl Ratio | 1 [—] |

Computational fluid dynamic simulations of an operating engine using the fuel of Cetane Number 30 have produced preliminary results as follows:

| Variable [Unit] | Ignitor on | Ignitor off |
|---|---|---|
| CO [g/kgf] | 0.3609 | 140.67 |
| HC [g/kgf] | 0.012 | 29.62 |
| Comb. Eta [%] | 99.99 | 94.21 |

Simulations suggest that the engine can work with cetane number as low as 15 (less than 20) and as high as 65 (greater than 50).

Figure 4:
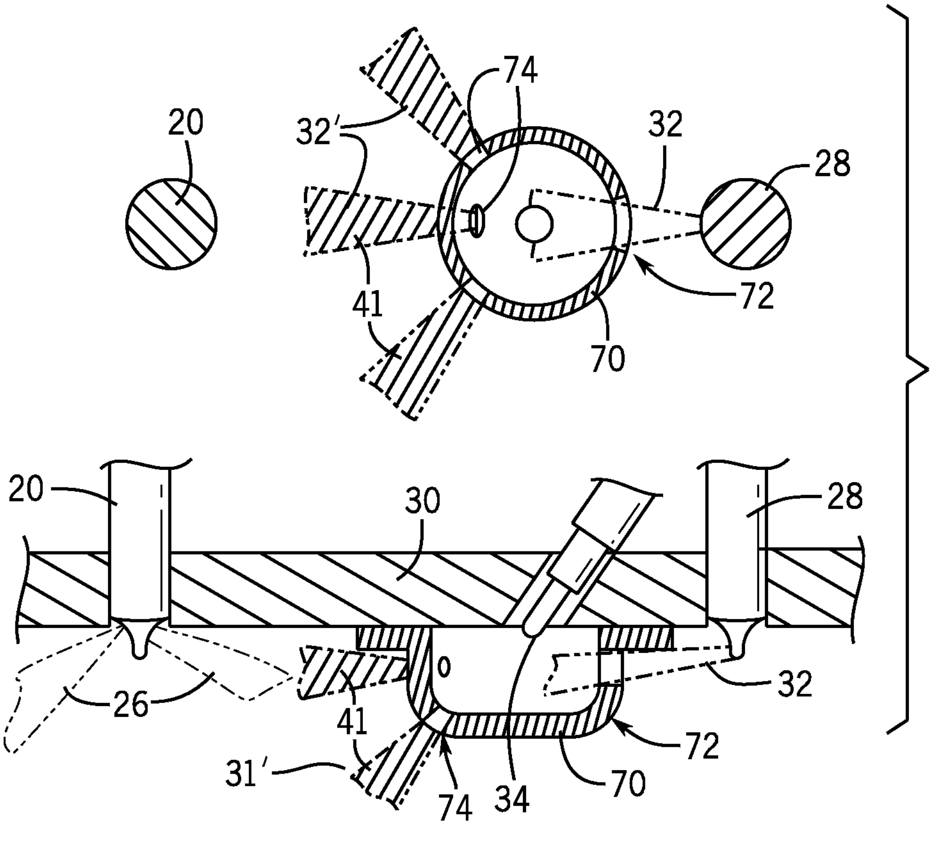
FIG. 4 is a top plan and side elevational cross-sectional view of a portion of the cylinder head holding the glow plug and pilot injector showing a glow plug chamber positioned around the glow plug to provide a controlled ignition environment and/or the generation of multiple separate plumes of fuel from the pilot injector.

Referring now to FIG. 4, in one embodiment, the tip 34 of the glow plug may be enclosed in a chamber 70 attached to the underside of the cylinder head 30 having an inlet 72 for receiving the plume 32 of the pilot injector 28 and having one or more exit openings 74 opposite the entrance inlet 72, the exit opening 74 allowing the ignited plume 32 to escape into separate pilot plumes 32' and corresponding pilot flames 40. These pilot plumes 32' may be directed to intersect the base of the plumes 26 as described above as well as to intersect downstream portions of those plumes 26 increasing the dispersion of a pilot flame. By controlling the sizes of the chamber 70, the entrance inlet 72, and the exit opening 74, the dwell time of the fuel of the plume 32 proximate to the glow plug tip 34 may be controlled for more consistent or better defined ignition.

Generally, the glow plug 36 may be replaced with other ignition sources including, for example, a laser.

Certain terminology is used herein for purposes of reference only, and thus is not intended to be limiting. For example, terms such as “upper”, “lower”, “above”, and “below” refer to directions in the drawings to which reference is made. Terms such as “front”, “back”, “rear”, “bottom”, and “side”, describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms “first”, “second” and other such numerical terms referring to structures do not imply a sequence or order unless clearly indicated by the context.

When introducing elements or features of the present disclosure and the exemplary embodiments, the articles “a”, “an”, “the” and “said” are intended to mean that there are one or more of such elements or features. The terms “comprising”, “including”, and “having” are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to “controller” should be understood to include one or more such devices that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words “means for” or “step for” are explicitly used in the particular claim.

What we claim is:

1. An internal combustion engine comprising:

a set of cylinders and interfitting pistons movable within the cylinders to compress air in a combustion chamber region at an end of each cylinder at a compression ratio of no less than 12:1;

a main injector assembly communicating with each combustion chamber having a conduit for receiving pressurized fuel leading to a nozzle directing a first spray of received fuel along at least one first spray axis and providing a valve positioned to move between a blocking state blocking fuel passing from the conduit to the nozzle and an unblocking state allowing a flow of the pressurized fuel from the conduit to the nozzle to exit as the first spray;

a pilot injector assembly communicating with each combustion chamber having a conduit for receiving pressurized fuel leading to a nozzle directing a second spray of received fuel along at least one second spray axis intersecting the at least one first spray axis so that fuel from the main injector assembly passing along the at least one first spray axis intersects fuel from the pilot injector assembly passing along the at least one second spray axis and providing a second valve positioned to move between a blocking state blocking fuel passing from the conduit to the nozzle and an unblocking state allowing a flow of the pressurized fuel from the conduit to the nozzle to exit as the second spray; and an igniter positioned along the at least one second spray axis to ignite the second spray.

2. The internal combustion engine of claim 1 wherein the first spray of the main injector extends radially outwardly from an injection point at a central axis of the combustion chamber and where the second spray of the pilot injector is directed to intersect the injection point.

3. The internal combustion engine of claim 1 wherein upper surface of the pistons include upwardly open bowl portions having a bowl bottom with a pip extending upwardly.

4. The internal combustion engine of claim 1 wherein including an injector valve controller controlling the first valve and second valve so that the second valve is actuated before the first valve with respect to a combustion cycle starting at top dead center of piston motion.

5. The internal combustion engine of claim 4 wherein the injector valve controller controls the first valve and second valve to inject more than twice as much fuel mass through the main injector than the through the pilot injector during a combustion cycle.

6. The internal combustion engine of claim 1 wherein the igniter is a glow plug and including a glow plug power source providing continuous power to the glow plug during operation of the engine.

7. The internal combustion engine of claim 1 including a chamber at least partially surrounding the igniter for receiving the second spray for exit through at least one chamber exit opening to increase a dwell time of the second spray in a vicinity of the igniter.

8. The internal combustion engine of claim 7 wherein the chamber includes multiple chamber exits.

9. The internal combustion engine of claim 1 further including an igniter controller changing power to the igniter as a function of at least one of engine load and engine speed.

10. The internal combustion engine of claim 1 wherein including a fuel source providing fuel to the main injector and pilot injectors of less than 40 cetane.

11. The internal combustion engine of claim 1 wherein the igniter is not a spark plug.

12. A method of operating an internal combustion engine of a type having:

a set of cylinders and interfitting pistons movable within the cylinders to compress air in a combustion chamber region at an end of each cylinder at a compression ratio of no less than 12:1;

a main injector assembly communicating with each combustion chamber having a conduit for receiving pressurized fuel leading to a nozzle directing a first spray of received fuel along at least one first spray axis and providing a valve positioned to move between a blocking state blocking fuel passing from the conduit to the nozzle and an unblocking state allowing a flow of the pressurized fuel from the conduit to the nozzle to exit as the first spray;

a pilot injector assembly communicating with each combustion chamber having a conduit for receiving pressurized fuel leading to a nozzle directing a second spray of received fuel along at least one second spray axis intersecting the at least one first spray axis so that fuel from the main injector assembly passing along the at least one first spray axis intersects fuel from the pilot injector assembly passing along the at least one second spray axis and providing a second valve positioned to move between a blocking state blocking fuel passing from the conduit to the nozzle and an unblocking state allowing a flow of the pressurized fuel from the conduit to the nozzle to exit as the second spray; and an igniter positioned along the at least one second spray axis to ignite the second spray;

the method comprising controlling the main injector and pilot injector assemblies to create a pilot flame fed by the second spray serving to ignite the first spray.

13. The method of claim 12 including controlling the first valve and second valve so that the second valve is actuated before the first valve with respect to a combustion cycle starting at top dead center of piston motion.

14. The method of claim 12 including controlling the first valve and second valve to inject more than twice as much fuel mass through the main injector than the pilot injector during a combustion cycle.

15. The method of claim 12 including providing a same fuel to the main injector and pilot injectors of less than 40 cetane.

* * * * *